United States Patent

[11] 3,610,739

| [72] | Inventor | Carl G. Seashore |
| | | 7341 Ash, Prairie Village, Kans. 66208 |
| [21] | Appl. No. | 3,597 |
| [22] | Filed | Jan. 19, 1970 |
| [45] | Patented | Oct. 5, 1971 |

[54] REAR VISION MIRROR SYSTEM
4 Claims, 4 Drawing Figs.

| [52] | U.S. Cl. | 350/307 |
| [51] | Int. Cl. | G02b 5/08 |
| [50] | Field of Search | 350/299–304, 307, 290; 356/21 |

[56] References Cited

UNITED STATES PATENTS

| 1,687,141 | 10/1928 | Price | 350/307 |
| 1,879,592 | 9/1932 | Thomas | 356/21 |
| 2,413,894 | 1/1947 | Sorensen | 350/307 |

FOREIGN PATENTS

| 1,368,579 | 1964 | France | 350/303 |
| 1,056,560 | 1953 | France | 350/303 |

Primary Examiner—David Schonberg
Assistant Examiner—Michael J. Tokar
Attorney—Scofield, Kokjer, Scofield & Lowe ABSTRACT: A rear vision mirror system for passenger cars and/or road vehicles has an interior plane mirror and a fender mirror mounted on each of the forward fenders of the passenger car utilizing the system. The fender mounted mirrors are convex and have a preselected radius of curvature, vertical and horizontal dimensions in conjunction with a mounting technique relative to the passenger car size so that the inside vertical edge of each convex mirror reflects a field of view having an inner boundary terminating in a vertical plane that is coextensive with the rearmost visible side of the respective passenger car. To insure this inner boundary, the mirrors are preset for each vehicle and movable only in vertical plane and within the median fore and aft field of view. The interior plane mirror is to be focused, by markings, with respect to the rear window of the passenger car and has a field of view that intersects with the available field of view of left and right convex fender mounted mirrors thereby eliminating blind areas either directly behind the host passenger car or in adjacent traffic lanes.

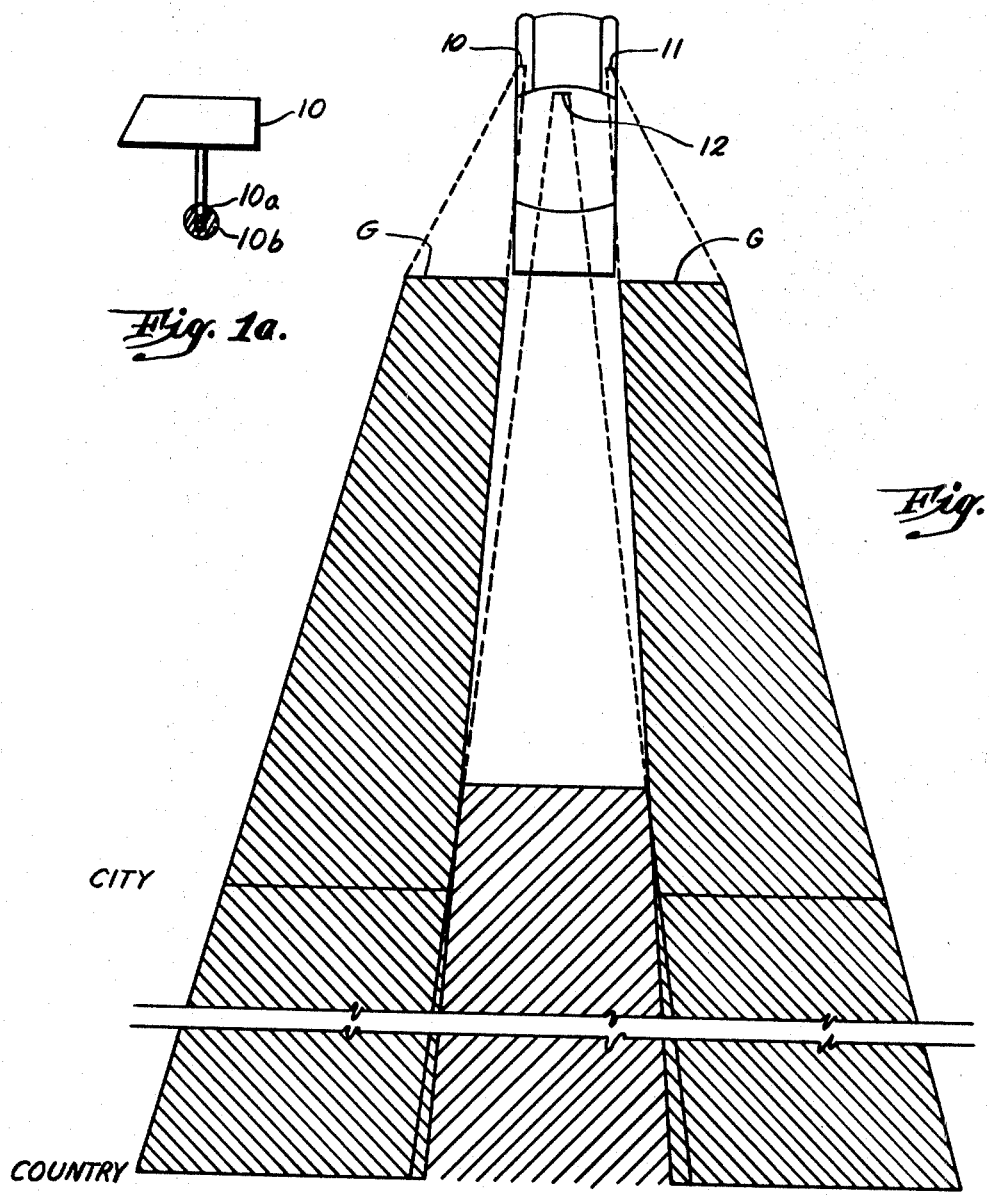
Fig. 1a.
Fig. 1.
CITY
COUNTRY
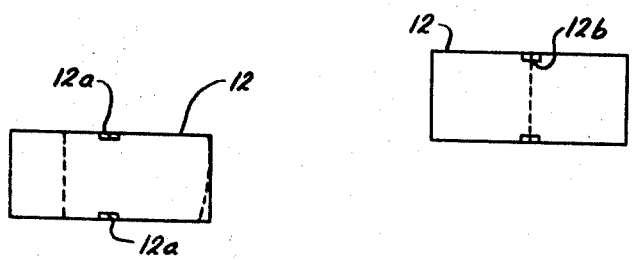
Fig. 2.
Fig. 3.
INVENTOR.
Carl G. Seashore
BY
ATTORNEYS

REAR VISION MIRROR SYSTEM

BACKGROUND AND BRIEF DESCRIPTION OF THE INVENTION

The problems associated with rear vision mirrors have been thoroughly discussed and acknowledged in numerous articles published through the Society of Automotive Engineers. For instance, the SAE journal, July Edition, 1965, on pages 30 through 41 has an article by Paul L. Conway, Konrad H. Marcus and W. A. Devlin, Jr. entitled "Look to the Rear with an Eye to Safety" which diagrammatically illustrates the areas of forward vision, the areas of peripheral awareness, areas defined by allowable head motion, blind areas, and normal fields of vision in interior rear vision mirrors. Other pertinent articles appearing in SAE publications are: (1) Paper Sp-142A; "Human Body Size and Passenger Vehicle Design" by Ross A. McFarland and Howard W. Stoudt; (2) Paper 690,271; "Designing and Evaluating Rear View Mirrors by Computer" by Harold W. Krauss, Gene Scofield and Paul Young; (3) Paper 690,270; "The Influence of Some Side Mirror Parameters on Decisions of Drivers" by Dr. Pieter L. Walreven and Dr. John A. Michon; (4) Paper 680,404; "Human and Visual Factors Considerations for the Design of Automotive Periscopic Systems" by Dr. Paul L. Conway and "Periscopic Rear Vision in Automobile" by Konrad H. Marcus; and (5) Paper 680,107; "The Scientific Application of Optics and Accident Prevention of Mirror Vision for Commercial Drivers" by Carl G. Seashore and Elmer G. Lundquist.

My invention relates generally to a rear vision mirror system including a unique optical arrangement which coordinates median eye level, seat location, and body shell dimensions of a passenger car to improve the available rear vision in passenger car vehicles.

My invention utilizes a pair of mathematically designed convex fender mounted mirrors, with each of the convex mirrors being mounted at a designed location on the left and right forward fenders of the passenger car vehicle. The convex mirrors are designed having a preselected radius of curvature and are mounted for movement only about the vertical (median fore and aft field of view) axis thereof. In this manner, the convex mirrors are fixedly coordinated with respect to the vehicle so that the inside edge of each convex mirror reflects the rearmost visible outside surface of the host vehicle and continues rearwardly of the vehicle until their respective fields of view terminate. Finally, the mirror system includes an interior plane mirror designed to reflect a planned field of view through the rear window of the host vehicle. Furthermore, the interior plane mirror will have focusing marks at indices thereon which are alignable with matching marks or indices on the rear window. When the two sets of focusing marks are aligned, the three fields of vision are optimized and coordinated with the body shell of the host vehicle. Likewise, the vertical height, and top and bottom widths of the fender mounted convex mirrors are coordinated with the body shell of the vehicle so that they first reflect the ground level adjacent to the rear end of the vehicle body shell and, by operator focusing (to "city" marking) terminate their reflective fields of view approximately two conventional car lengths (or from 33 to 38 feet for city driving) driver option permits interim focusing to a "country or turnpike" position, up to five car lengths to the rear of the host vehicle. The flat plane mirror will not reflect the ground level, if properly focused, until immediately prior to or shortly after the field of view of the plane mirror intersects the field of view of each of the fender mounted mirrors at their inner boundaries. Since the convex fender mounted mirrors are fixedly mounted so as to preclude horizontal mirror movement with respect to the host vehicle, each fender mirrors' field of view skims the rearmost visible side surface of the vehicle and continues rearwardly until it terminates, within the "city" or "turnpike highways" adjustment parameters. In this manner, a mirror system may be designed and utilized which will be suitable for an optimum percentage of the available bisexual driver-operators so that the rear vision for each is optimized.

The primary object of my invention is to increase and potentially insure the safer operation of passenger car vehicles, that portion based on functional and integrated mirror vision. My invention utilizes a unique rear vision mirror system to satisfy the visual needs which relate to the driving task.

Another object of my invention is to provide a mirror system for passenger car vehicles which includes two fender mounted convex mirrors and an interior plane mirror. It is a feature of my invention that the lateral fields of view of the convex mirrors are preset, and adjustable from the driver compartment, in accordance with the structure used to mount the convex mirrors on the forward fenders of the passenger car vehicle.

Another object of my invention is to provide a mirror system of the character described above wherein the interior plane mirror is focusable to automatically and correctly align the fields of vision in all three mirrors in accordance with variable but integrated anthropometric and vehicle standards.

A still further object of my invention is to provide a rear vision mirror system for passenger car vehicles which has been mathematically designed to anthropometric standards. It is a feature of this object that both the radius of curvature of the convex fender mounted mirrors and the vertical height and top and bottom widths of same are coordinated with the focused position of the interior plane mirror so that the corresponding fields of view optimize the rear vision of a driver whose eye level is within the fifth and the 95th percentiles. In this regard, only 5 percent of all drivers are smaller than the fifth percentile for the eye level dimension and only 5 percent are larger than the 95th percentile.

A still further object of my invention is to provide a unique passenger car mirror system of the character described wherein the fender mounted mirrors may be adjusted from within for either city or turnpike/country driving (or in between, at driver option) without any readjustment of the interior plane mirror.

Other and further objects of the invention, together with the features of novelty appurtenant thereto, will appear in the course of the following description.

DETAILED DESCRIPTION OF THE INVENTION

In the accompanying drawing, which forms a part of the specification and is to be read in conjunction therewith and in which like reference numerals indicate like parts in the various views:

FIG. 1 is a top plan view of a conventional passenger car vehicle utilizing my mirror system with the fields of view above the ground level indicated by the broken lines and with the fields of view reflecting the ground level being shaded;

FIG. 1a is a sectional view of a typical base or mounting means for the convex mirrors;

FIG. 2 is an unfocused front elevational view of the flat plane interior mirror with the rear window and respective target marks shown in broken lines and out of focus with the focusing marks on the interior mirror; and FIG. 3 is a front elevational view of the interior flat plane mirror with its focusing marks aligned with the rear window target marks thereby properly focusing the interior plane mirror with the fender mounted convex mirrors.

Turning now more particularly to FIG. 1, a pair of fender mounted mirrors 10 and 11 are mounted on the forward left and right fenders respectively of a conventional passenger car vehicle. In considering the two fender mounted convex mirrors, it should be understood that the operation and mounting procedure will be the same for each one.

The fender mounted mirrors are adjustable only within the design limits of the median field of view, with suitable adjusting linkages extending from each mirror or its base to the interior of the passenger car vehicle so that the position of the mirror may be remotely controlled by each driver. Each convex mirror frame or base is constructed so that the mirror may be moved only about the median field of view axis of same or (e.g. each mirror may be tilted relative to its vertical position)

stated another way, the convex mirrors are adjustable only along the median fore and aft field of view axis of each mirror. FIG. 1a shows a possible ball and socket type mount which includes a disc-shaped ball 10a movably located within a mating socket in base mount 10b. In this manner, the vertical inner edge of each convex mirror is maintained in a fixed plane, however movement about the horizontal axis of disc-ball 10a is permitted.

With lateral or horizontal movement of the convex mirrors precluded, each convex mirror is mounted relative to the body shell of the passenger car vehicle so that the inner edge of each convex mirror reflects a field of view that skims the rearmost visible side surface and is immediately adjacent to the respective sides of the body shell. In this regard, most of the American automobile manufacturers have only three to five different sized body shells therefore limiting the location, positioning and size of the convex mirror per body shell size. Further, it should be pointed out that the field of view of each convex mirror continues to the rear of the host vehicle with its inner boundary being maintained at a vertical plane coincident with the rearmost visible sides of the body shell and extending, within "city/country" adjusting limits, rearwardly thereof.

As shown in FIG. 1, the convex mirrors first reflect the ground view adjacent the rear end extremity of the vehicle at the line indicated by the letter G. The fields of view from mirrors 10 and 11 expand laterally outwardly from the respective sides of the vehicle at a rapid rate to encompass a protective portion of each adjacent traffic lane and from thence rearwardly and laterally to the lines indicated as "city". At this point, the field of view of each convex mirror will terminate when the mirror system is oriented for city driving. In a similar manner, the line indicated as "country" will be the termination of the available reflected view of each fender mounted convex mirror when same is oriented for turnpike or country driving. Optionally, the driver may focus either convex mirror at a position between "city" and "country".

At this point, it should be understood that the field of view of each convex mirror is controlled by its designed size and shape which primarily includes the vertical height and horizontal widths of the mirror, the mirror mount and the radius of curvature of the mirror. In this regard, the vertical height of the convex mirrors will be so selected that the ground view of the adjacent lane occurs at or near the rear end extremity of the vehicle and terminates for city driving at a location approximately two car lengths to the rear of the vehicle. It has been found that the "city driving" termination of the field of view for the convex mirrors may conveniently lie in a range of between 33 to 38 feet rearward of the host vehicle for most of the optimal "city" rear vision selectivity. In a like manner, the limitation of the field of view for the turnpike or country setting will be approximately five car lengths or approximately 75 to 100 feet to the rear of the vehicle, or in between "city" and "country" focusing, for driver option. With the above in mind, I have found that a median size vehicle might require a convex mirror having a vertical height of four inches and a lateral dimension of six inches across the top, with the inner edges at a vertical 90° and outer edges shaped to permit the bottom outer edge to be expanded to seven inches in order to permit a wider lateral view alongside the host vehicle. Stylists optionally may prefer a rectangular-shaped convex mirror. Further, the fender mounted convex mirrors are located relative to the driver's side of the vehicle so that the full binocular view of the driver will fall within an S.A.E. suggested maximum 30° of straight ahead vision while the convex mirror on the opposite fender will be located within a maximum 45° of the binocular view of the driver, both visible with easy eye or head movement.

For most satisfactory vision conditions, the convex mirrors should have a radius of curvature of approximately 75 inches (1,905 mm.). Convex mirrors having a radius within a range of from 50 to 100 inches have been found to operate satisfactorily even through the 75-inch radius is the preferable embodiment. With this particular radius (or radius range), the mirror is operative to reflect the inner boundary which is substantially along its respective and rearmost visible side or portion (fender) of the vehicle and to the rear thereof and a laterally expanding field of view that includes a protective portion of the adjacent traffic lane at the rear end of the vehicle and expands rearwardly thereof so as to provide, at the "city" marking, a minimum two-thirds coverage of the adjacent traffic lanes assuming 12-feet lanes. Finally, each convex mirror is provided with a suitable mirror adjusting mount which may be remotely manipulated to control the vertical positioning of same from inside the vehicle, however, maintaining the inner edge of each convex mirror within its intended field of view.

Turning now to the interior mirror, same is generally indicated by the numeral 12 and is shown in elevation in FIGS. 2 and 3. This plane mirror has focusing marks 12a which are alignable with target marks 12b on the rear window of the host vehicle. These marks (both focus and target) may be etched or otherwise constructed to incorporate small permanent marking materials which are plainly but inconspicuously visible.

The length of the interior plane mirror, with a minimum includes field of view angle of 220°, is such that the reflected vision is same eventually intersects the fields of view of the fender mounted convex mirrors. For example, the field of view of the plane mirror is through the rear window area and begins to reflect the ground level to the rear of the host vehicle generally within a preselected distance prior to the convex mirror "city" focusing defined above. It should be pointed out that plane mirror 12 may not always reflect the ground level at the point of intersection with the inner boundaries of the fields of view of the convex mirrors, however, such intersection generally occurs within 1 to 2 feet of ground level which is sufficient to show and give warning to the driver of the presence of an overtaking vehicle or stationary object.

Summarizing the above-described rear vision mirror system, the fender mounted convex mirrors have a definite relationship established with the interior plane mirror. The vertical height and horizontal widths (top and bottom) of the fender mounted mirror and the radius of curvature of same are selected in conjunction with the size and standard focusing of the plane interior mirror so that fields of view intersect at critical areas to the rear of the host vehicle. An approximate 75-inch radius of curvature cooperates with fender mirror mounting means to insure that the inner edge of each convex mirror reflects the adjacent area immediately rearward of the vehicle, and along the side portions thereof, and move laterally outwardly therefrom to include a protective field of view adjacent the left or right traffic lane. In this manner, the inner vertical edge of each convex mirror is coordinated with its vertical height to optimalize the field of view capacity of same.

It was pointed out above that the convex fender mounted mirrors begin to reflect the ground surface adjacent to the rear end of the host vehicle and may by driver selection, terminate at any point within a distance from two to five car lengths rearward of the rear end of the host vehicle. These adjustable fields of view are coordinated with the focusable field of view of the interior plane mirror so that same reflects the activity immediately behind the host vehicle through the rear window portion thereof and intersects the inner lateral boundary of the convex mirrors within a two car length range. Accordingly, the fields of view available to a driver at the median eye level in a median seat location decrease and for all practical purposes eliminate blind areas or mirror vision. For example, an overtaking vehicle approaching from the rear in the same lane as the host vehicle will first be visible in the interior plane mirror. This field of vision is practically horizontally infinite (depending on the horizon) to the rear of the host vehicle. If an overtaking vehicle moves to an adjacent lane, it will move into an area visible in appropriate convex fender mounted mirrors if the move is made within the two car length rearward setting for city driving or the five car length rearward setting for country or turnpike driving, or in between, if the driver so prefers. Also, a movement rearwardly of the two car length boundary from the traffic lane immediately behind the host vehicle to the lane adjacent thereto to the rear of the intersecting points shown in FIG. 1 will be visible first in the interior plane mirror field or view, thence in the field of view of left or right convex mirror.

From the foregoing, it will be seen that this invention is one well adapted to attain all of the ends and objects hereinabove set forth together with other integrated advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A rear vision mirror system for road vehicles having a front end portion including two forward fenders, sides having at a portion thereof in a substantially vertical plane, and a rear end portion, said system comprising the first and second convex mirror, each of said convex mirrors having a vertical height, horizontal width and radius of curvature which will reflect a field of view having an inner boundary reflecting an approximate ground level at the rear end side portion of said vehicle and a rearward continuing inner boundary field of view therefrom along a vertical plane coextensive with the rear end side portion of said vehicle to a terminating location within a distance range of from 33 to 100 feet past the rear end of said vehicle, said field of view expanding laterally from said vertical plane defining said inner boundary into an adjacent traffic lane a minimum of 8 feet at the 33-foot distance from the rear of said vehicle and a minimum of 12 feet at the 100-foot distance into said adjacent traffic lane, means for mounting said first convex mirror on the outside of one of said forward fenders of said vehicle, means for mounting said second convex mirror on the outside of the other of said forward fenders of said vehicle, a plane mirror mounted interiorly of said vehicle, the field of view of said plane interior mirror being through the rear window portion of said vehicle expanding laterally to intersect the inner boundaries of the fields of view of the convex mirrors within an outer limit distance of 33 to 38 feet or two conventional car lengths from the rear end of said vehicle.

2. The invention as in claim 1 wherein each mounting means for each convex mirror is movable only about the median fore and aft field of view axis of same, said inner boundary of each field of view of each convex mirror remaining at a constant location relative to said vehicle.

3. The invention as in claim 1 wherein said interior plane mirror has focus marks thereon, said vehicle having a rear window, said rear window having target marks thereon, said interior mirror being movable so that the focus marks on same are alignable with the reflected view of the target marks thereby coordinating said fields of view of said plane mirror and said convex mirrors.

4. The invention as in claim 7 wherein each mounting means for each convex mirror is only movable about the median fore and aft field of view axis of same, said inner boundary of said field of vision thereby being held at a constant location with respect to said vehicle so that when said plane mirror is focused in accordance with said focusing marks, the fields of view are coordinated.